(12) United States Patent
Burchall et al.

(10) Patent No.: US 7,240,066 B2
(45) Date of Patent: Jul. 3, 2007

(54) UNICODE TRANSITIONAL CODE POINT DATABASE

(75) Inventors: Laurion Burchall, Seattle, WA (US); Ian Charles Jose, Redmond, WA (US); Jonathan Liem, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 463 days.

(21) Appl. No.: 10/440,942

(22) Filed: May 19, 2003

(65) Prior Publication Data

US 2004/0237046 A1    Nov. 25, 2004

(51) Int. Cl.
G06F 17/30    (2006.01)

(52) U.S. Cl. ............... 707/101; 707/2; 707/200

(58) Field of Classification Search ........ 707/1–7, 707/101, 102, 200, 201
See application file for complete search history.

(56) References Cited

U.S. PATENT DOCUMENTS

| 5,787,452 | A  | * | 7/1998  | McKenna ............... 715/536 |
| 5,793,381 | A  | * | 8/1998  | Edberg et al. ........... 345/467 |
| 6,400,287 | B1 |   | 6/2002  | Ehrman .................. 341/55 |
| 6,445,458 | B1 |   | 9/2002  | Focazio et al. ......... 358/1.11 |
| 6,470,347 | B1 |   | 10/2002 | Gillam ................... 707/101 |
| 6,490,051 | B1 |   | 12/2002 | Nguyen et al. ......... 358/1.15 |
| 6,539,118 | B1 |   | 3/2003  | Murray et al. ......... 382/229 |
| 6,883,007 | B2 | * | 4/2005  | Atkin ..................... 707/101 |

OTHER PUBLICATIONS

"What is Unicode?", retrieved from http://www.unicode.,org/standard/WhatIsUnicode.html on May 31, 2005 (2 pages).
Unicode Home Page, Basic Technology, retrieved from http:www.unicode.org/ on May 31, 2005 (1 page).

* cited by examiner

Primary Examiner—Cheryl Lewis
(74) Attorney, Agent, or Firm—Workman Nydegger (57) ABSTRACT

Methods, a data structure and computer readable mediums address newly-defined code points in a Unicode index of characters by allowing processing of strings that use those newly-defined code points although a database holding an index of Unicode characters has not yet been updated. A method is directed to processing strings including one or more code points associated with an index of code points mapped to an expandable alphabet, such as the Unicode index. The method includes tracking each string that has code points mapped to undefined items and processing the tracked strings outside the processing of strings with defined items. An embodiment provides for creating a database for maintaining the index to the code points mapped to the previously undefined items. For each code point mapped to a previously undefined item a table entry can be created so the entries identify newly defined code points to enable processing the tracked strings.

21 Claims, 4 Drawing Sheets

UNICODE TRANSITIONAL CODE POINT DATABASE

FIELD OF THE INVENTION

This invention relates generally to the Unicode, and more specifically, to a system and method for determining previously undefined code points.

BACKGROUND OF THE INVENTION

The Unicode Standard refers to a code that provides a unique number for every character regardless of platform, program, or language. Unicode Standard is a character coding system designed to support the worldwide interchange, processing, and display of the written texts of the diver language of the modern world, including classical and historical written languages. The Unicode Standard is ubiquitous, supported by many operating systems and browsers, and has an increasing number of tools for support. The Unicode Standard is required by modem standards such as XML, Java, ECMAScript (JavaScript), LDAP, CORBA 3.0, and WML, and is the official way to implement ISO/IEC 10646.

Unicode is important because it is extensible and intended to be adequate for all characters and all languages. Before Unicode was invented, there were hundreds of different encoding systems for assigning numbers to characters. There was no single encoding adequate to encode English letters, punctuation and technical symbols. Moreover, prior encoding systems conflicted with one another such that any two encodings frequently assigned a same number for two different characters, or used different numbers for the same character. Servers that supported multiple encodings therefore risked data corruption.

The Unicode standard currently supports three encoding forms sufficient for all known character encoding requirements. Specifically, the majority of common-use characters fit into the first 64,000 code points, an area of the codespace that is called the basic multilingual plane, or BMP for short. There are about 6,700 unused code points for future expansion in the BMP, plus over 870,000 unused supplementary code points on the other planes. More characters are under consideration for addition to future versions of the standard. The Unicode Standard also reserves code points for private use.

The character encoding standards define the identity of each character and its numeric value, or code point, and how the code point is represented in bits. The three encoding forms allow the same data to be transmitted in a byte, word or double word oriented format (i.e. in 8, 16 or 32-bits per code unit). All three encoding forms encode the same common character repertoire and can be efficiently transformed into one another without loss of data. The Unicode is extensible in that new characters can be added and assigned to new characters using the unused code points.

One problem with implementing the Unicode Standard is that the index is large and when new code points are added re-indexing the Unicode to account for the new code points can take hours of processing time. There is a need for a method of accounting for the new code points without requiring the hours of processing required for re-indexing.

BRIEF SUMMARY OF THE INVENTION

Accordingly, a method, data structure and computer readable medium are provided that addresses newly-defined code points in a Unicode index of characters by allowing processing strings that use those newly-defined code points even though a database holding an index of Unicode characters has not yet been updated. More specifically, a method is directed to processing strings including one or more code points associated with an index of code points mapped to an expandable alphabet, such as the Unicode index. The method includes tracking each string including code points mapped to previously undefined items in the Unicode and processing the tracked strings outside the processing of strings including only defined items in the expandable alphabet.

To track each string, an embodiment provides for creating a database for maintaining the index to the code points mapped to the previously undefined items. For each code point mapped to a previously undefined item a table entry can be created. Thus, the entries in the table can be used to identify newly defined code points to enable processing the tracked strings. Also, to track each string, an embodiment provides for identifying each code point that maps to a same index entry in the index of code points. For example, those code points that are undefined could map to a same index entry or a null. If code points are found that map to a same index entry, an embodiment provides for maintaining an entry in the table for those code points.

The processing of the tracked strings includes first normalizing the entries in the table using an obsolete index, and then normalizing the entries in the table using a current index. If entries are found that normalize to different results, the different results are indicative of newly defined code points.

Another embodiment is directed to updating expanding persisted data in a database holding one or more index entries, such as Unicode entries. One or more of the index entries can be associated with a record containing undefined code points. The method includes deleting index entries using a prior normalized version of the index entries stored in the database, normalizing the data using an updated normalized version of the index entries using the records, and inserting index entries defining previously undefined characters. In an embodiment, the inserted index entries map to a key in the database. The entries can also operate as place holders for previously undefined entries such as Unicode entries in the database.

Another embodiment is directed to a data structure for a database. The database includes an index of entries mapping a plurality of code points, such as Unicode characters. The data structure also includes characters, a table including table identifiers, entries associated with the index of entries and a key to the index of entries. In an embodiment, the table can include index entries that map to newly defined code points so that the table can enable processing of the newly defined code points outside of processing of code points in the index of entries.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
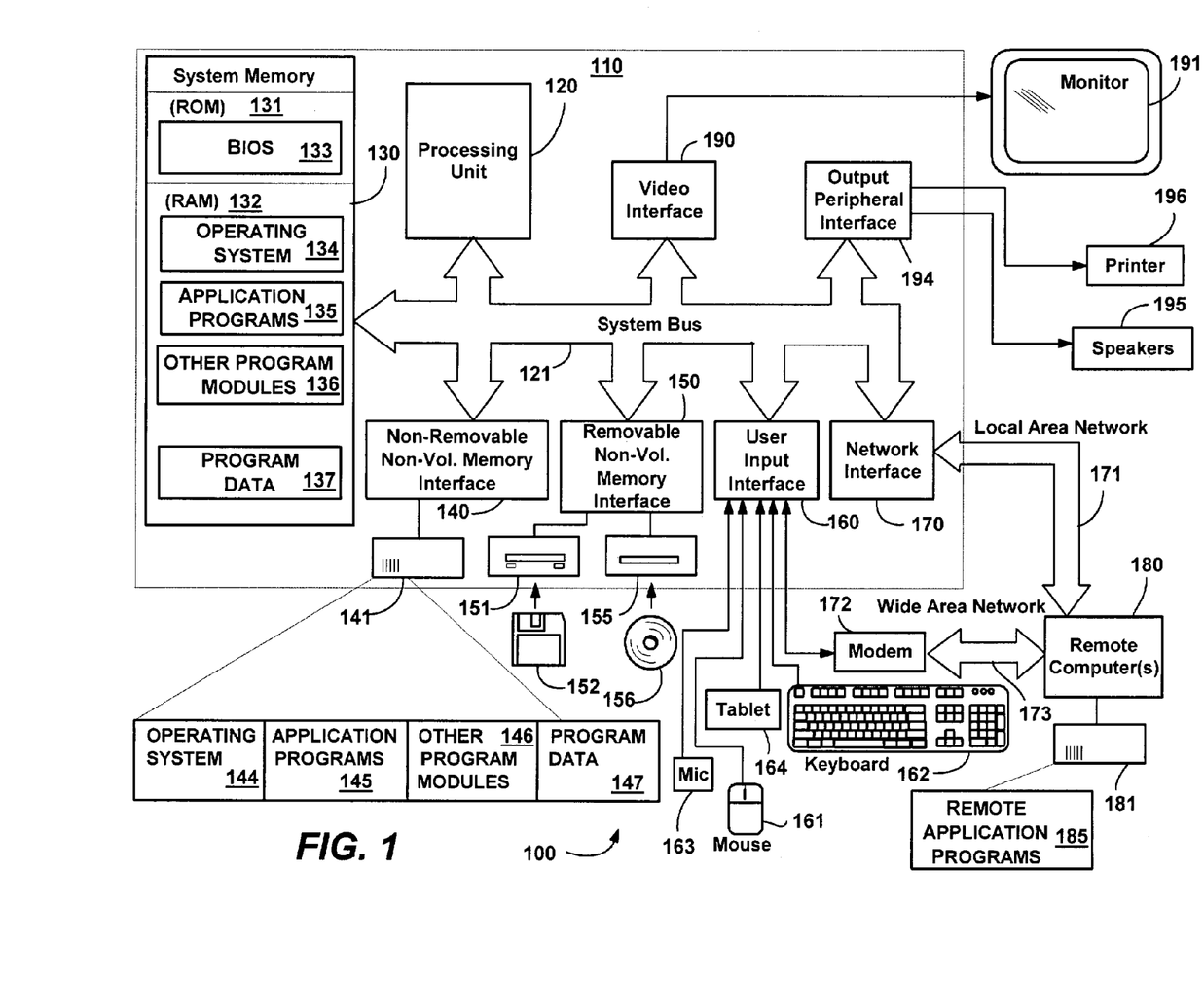
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
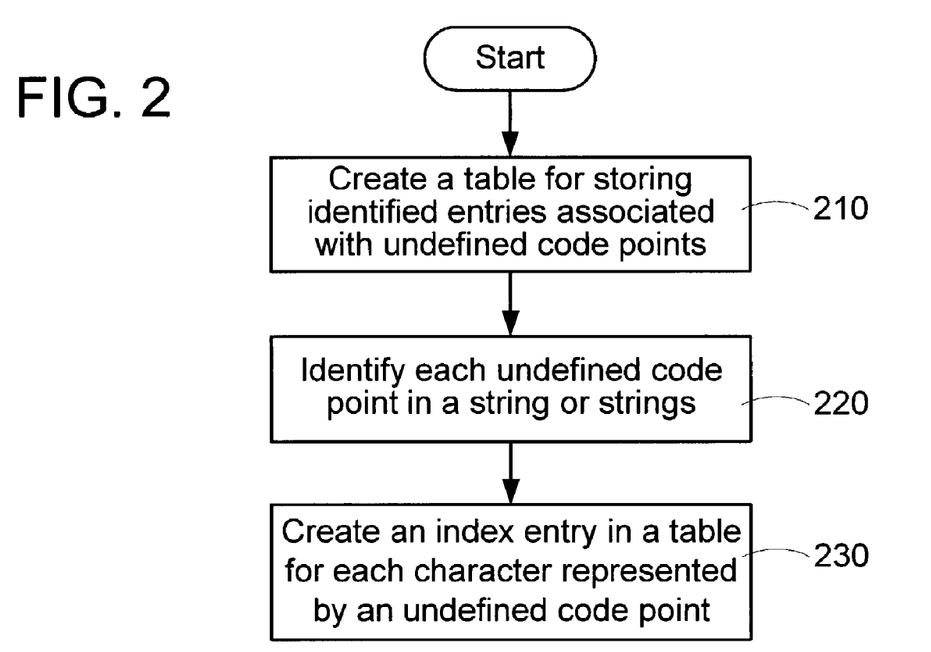
FIG. 2 is a flow diagram illustrating a method for determining whether new code points should be processed according to an embodiment of the present invention.

Referring now to FIG. 2, an embodiment is directed to a method for processing Unicode strings that include code points for a newer version of a Unicode index than was available at the time the local Unicode database was created. For example, when a string contains code points that are not parsable because they are for a newer updated index, those code points are undefined and indistinguishable from code points that are not yet defined. Therefore, when new characters become defined, the strings containing the newly defined code points sort as undefined code points if the index has not yet been updated. As illustrated in FIG. 2, an embodiment avoids having those strings containing newly-defined code points parse as undefined code points. The method provides for tracking any strings containing newly defined code points and processing the strings containing the newly defined code points outside of the index. More particularly, block 210 provides for creating a table, for storing index entries associated with identified undefined code points. Block 220 provides for identifying each undefined code in a string or strings. Methods of identifying undefined code points include performing a sorting algorithm or performing a normalization algorithm or the like. Block 230 provides for creating an index entry in the fix up table for each character represented by an undefined code point, even if an undefined code point normalizes to a same value as another undefined code point. Importantly, strings with undefined code points all normalize or sort to a null or other same result if run under an older version of Unicode. In the embodiment, rather than defining one index entry in the fix up table for all undefined code points, the fix up table creates an index entry for each character that is undefined as represented by a code point.

For example, one string can support multiple index entries. When a string contains multiple undefined code points, each of the undefined code points will normalize to a same Unicode database entry if run under the older version of the Unicode. According to an embodiment, the fix-up table creates entries for each undefined code points even though the database may have a single entry for the given undefined code point. This results in a many-to-one mapping of fix-up entries in the fix up table to entries in the database entries.

Figure 3:
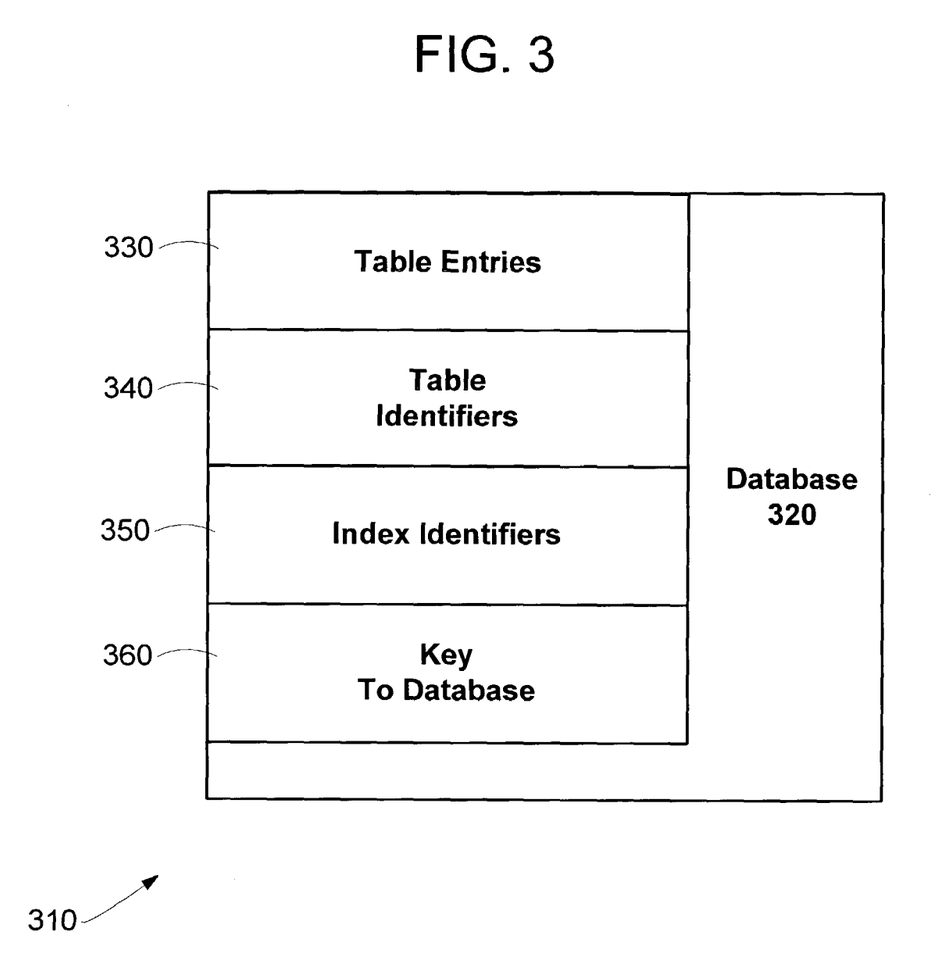
FIG. 3 is a block diagram of a database including a fix up table in accordance with an embodiment of the present invention.

The fix up table contains a subset of database index entries which were indexed over previously undefined characters. Referring now to FIG. 3 in combination with the pseudo code shown below in Table 1, one embodiment is directed to a data structure for the fix up table. As shown, FIG. 3 is a block diagram illustrating a fix up table appropriate for embodiments herein. As shown, the fix up table 310 can be a table within a database 320 appropriate for Unicode. Fix up table 310 includes data structures including table entries 330, table identifiers 340, index identifiers 350 and a key to the index, which can be a normalized key 360. Normalized keys 360 are used to find an associated record in the Unicode index 370 of database 320. The normalized key functions as a way to find an associated character to the previously undefined code point. In one embodiment, the fix up table stores only normalized data. For example, the normalization method applicable to the Unicode index for which the fix up table is created is used to determine the normalized data for the fix up table. Then, after the fix up code finds and stores the normalized strings containing undefined code points, the fix up table is used to identify which of the undefined code points have become defined code points.

Importantly, the fix up table 310 contains normalized data that is normalized using a prior version of the Unicode. The normalization of the items in the fix up table normalize differently for a later version of the Unicode. Although the identity of the characters that are now defined could be unknown, the fix up table enables locating which of the undefined characters became defined. This is true because index records that were duplicates under an old normalization scheme are not duplicates under a new normalization scheme.

The pseudo code below illustrates code that determines whether to run fix up code:

TABLE 1

```
if ( database is writeable AND OS version in database header <
Current OS version)
    delete uNICODE table
    reset fixup flags on all indexes
if ( NOT-repair AND not-read-only AND IsNLSDefinedString is
supported )
    try to create Unicode index (no error if it already exists)
if ( JET_bitDbDeleteUnicodeIndexes specified AND NOT-read-only )
    delete all unicode indexes
    finished
if (recovering OR current OS version IS OS version in database
header )
    finished
if ( NOT JET_paramEnableIndexChecking AND NOT
JEL_paramEnableIndexFixup )
    finished
if ( JET_paramEnableIndexChecking is set )
    go through the catalog
    for each unicode index
        if ( IsNLSDefinedString isn't supported )
            delete the index
        if ( sort version for the index is NULL )
            delete the index
        if ( NLS version for index NOT= OS version )
            delete the index
        if ( defined version for index > OS version )
            delete the index
        if ( defined version for index < OS version )
            remember to run fixup
        if ( index couldn't be deleted ) // read-only, primary-
        index, template-table, derived-index
            return
            JET_errSecondaryIndexCorrupted/JET_errPrimaryIndexCor
            rupted
        if ( NOT-read-only AND fixup needed )
            run fixup
        if ( read-only AND fixup needed )
            return JET_errSecondaryIndexCorrupted
        if ( indexes were deleted )
            return JET_wrnCorruptIndexDeleted
        else if ( JET_paramEnableIndexFixup )
            run fixup
            update OS version in database header
```

The pseudo code above operates to compare operating system versions (OS version) in a database header to determine which version of the Unicode is operating on a system associated with a database header. The pseudo code creates a fix up table that includes all Unicode indexes and deletes the indexes according to the criteria recited. Those indexes that remain are those for which the version of Unicode is older than the OS version of the Unicode. In operation pseudo code operates on received strings of data. The strings are parsed using a predetermined index associated with an older version of Unicode. The returned index is loaded into the fix up table as normalized data. The pseudo code above identifies any strings that contain undefined characters that are associated with a version of Unicode that is older than the OS version. These strings are located and the fix up table is created based on the normalization of the strings of data after operating a version of Unicode. If portions of the received string are not corrupt, and are not "read only" the strings or code points therein are stored in the fix up table.

The fix up table operates as a secondary index that maps a normalized key (or physical location of the record) to a unique identifier for a record. A unique identifier for a record is its primary key. To change a primary key for a record, all of the index entries for the record must be recreated and obsolete records must be deleted. The fix up table enables locating those records so that they are capable of being identified.

Figure 4:
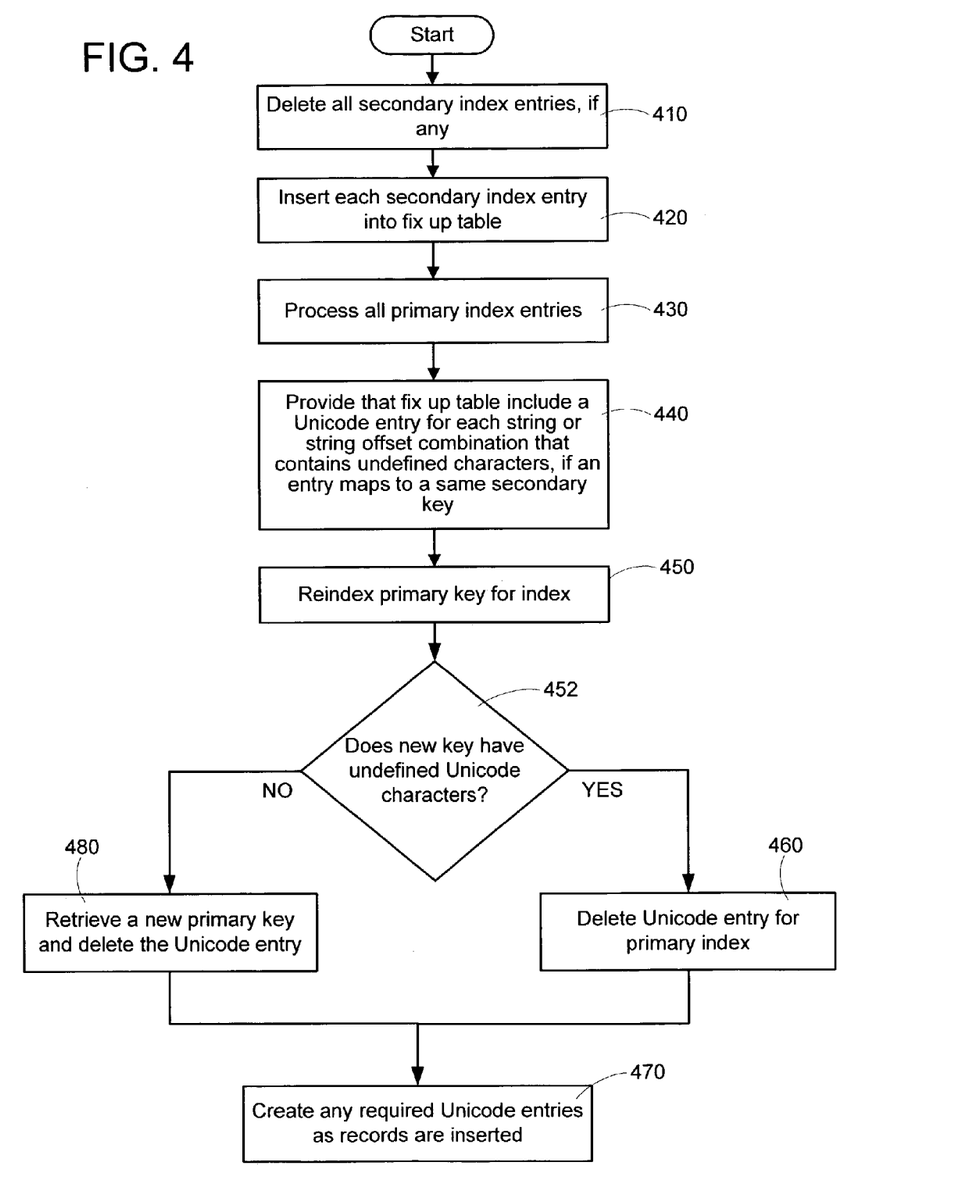
FIG. 4 is a flow diagram illustrating a method for operating a fix up table in accordance with an embodiment of the present invention.

Referring now to FIG. 4, the operation to fix up a Unicode index is performed via the method illustrated in the flow diagram of FIG. 4. Block 410 provides for deleting all secondary index entries if present. The secondary index entries represent those that could represent undefined code points. Block 420 provides for inserting each secondary index entry into the fix up table. Block 430 provides for processing all primary index entries. There may be multiple Unicode entries for the same secondary index entry. If the Unicode processes the entries and the normalized key has changed due to a newer version of the Unicode being available with updated code points, an attempt at deleting a secondary index entry will fail. The presence of multiple Unicode index entries is due to the defining characters making strings that will normalize to a same value using an obsolete index, but will normalize to a different value using an updated index. For example, if X and Y are both undefined characters, the normalization of X and Y will result in a normalization, or sorting of such that X and Y in combination with defined characters will normalize the same: "aXb" will normalize to "ab" and "aYb" will normalize to "ab".

Therefore, there will be only one secondary index entry. If character X is defined, but Y is undefined, "aXb" will normalize to "aXb", and "aYb" will normalize to "ab". Thus, after X becomes defined, rather than the identical results of "ab" for both X and Y, there are two different index entries. To insure that the normalization of entries is different, i.e., that the two code points map to different index entries rather than a same index entry, block 440 provides for having the fix up table include a Unicode entry for each string or string offset combination that contains undefined characters, even if the entry maps to the same key. The deletion of secondary index entries is accomplished after the processing of later defined code points because the secondary index deletion/insertion cannot be accomplished in one pass. Block 450 provides for re-indexing the primary key for the index. In one embodiment, code is used to remove all the secondary index entries and recreate them, and also delete them from the Unicode index if necessary. If the new key still has undefined Unicode characters, block 460 provides for deleting a Unicode entry for the primary index. Block 470 provides for creating any required Unicode entries as records are inserted. In one embodiment, the creating of required Unicode entries includes fixing all secondary index entries even though they are later deleted as the primary key changes.

In one embodiment, if the new primary index key contains no undefined Unicode characters the Unicode entry is not deleted, rather, in that case, block 480 provides for retrieving a new primary key and deleting the Unicode entry only the new primary index key contains no undefined characters.

The embodiments described with reference to FIG. 4 can be performed differently and remain within the scope of the present invention. For example, index ranges can be set so that narrower ranges of records are processed. Also, by caching the last table or index the processing of is made more efficient when records are clustered by table/index.

In one embodiment, additional code is directed to detecting whether the step of deletion and insertion is necessary by detecting whether a change has occurred. Also, additional code can be directed to performing the insertion of secondary index entries with the fix-up of primary index entries. If the primary index on a Unicode index has an object identifier as a descending key element, the primary index entries will be the last entries processed for a given table because the primary index has the lowest object identifier.

We claim:

1. In a computing system that processing characters encoded according to an expandable alphabet standard, a method for processing one or more strings of data even when characters in the one or more strings of data are undefined by an obsolete index stored in a first database, the obsolete index including code points for the expandable alphabet standard, the method comprising:
    receiving one or more strings of data encoded according to an encoded expandable alphabet standard;
    accessing an obsolete index for the encoded expandable alphabet standard used to encode the received one or more strings of data, wherein the index associates a numerical value to each of a plurality of characters, and such that each numerical value is a code point;
    identifying one or more undefined code points in the received one or more strings, wherein the undefined code points are not associated with any character by the obsolete index;
    tracking each string including undefined code points;
    for each undefined code point not associated with a character by the obsolete index, creating an entry in a table stored in a second database;
    processing the tracked strings outside the processing of strings including only defined code points which are associated with characters by the obsolete index; and
    updating the obsolete index to produce an updated index in the first database, the updated index including newly defined code points which were undefined in the obsolete index.

2. The method of claim 1 further comprising:
    creating a database for maintaining the index; and
    using the entries in the table to identify newly defined code points to enable processing the tracked strings.

3. The method of claim 1 wherein the tracking includes:
    identifying each code point that maps to a same index entry in the index of code points; and
    maintaining an entry in the table for each code point that maps to the same index entry.

4. The method of claim 3 wherein processing the tracked strings includes:
    normalizing the entries in the table using the obsolete index; and
    normalizing the entries in the table using a current index; and
    identifying the entries for which the normalizing produces different results, the different results indicative of newly defined code points.

5. The method of claim 1 wherein the encoded expandable alphabet standard is a Unicode Standard.

6. The method of claim 1, wherein the undefined code points are defined in a newer version of the index, and are not parsed as code points that are not yet defined.

7. The method of claim 1, wherein the first and second database are the same database.

8. In a computing system which processes characters according to an expandable alphabet, the expandable alphabet mapping characters to a database of defined code points, a method for updating data in a database holding one or more index entries, each index entry being associated with a record and one or more of the index entries associated with a record containing one or more undefined code points, wherein the database is updated without the need to re-index all index entries, the method comprising:
    deleting index entries associated with a record containing one or more undefined code points, the deleting using a prior normalized version of the index entries stored in the database;
    normalizing the data in the database using the records, the normalizing associated with an updated normalized version of the index entries; and
    inserting one or more index entries, the inserted index entries defining previously undefined characters, and thereby updating the database.

9. The method of claim 8 wherein the database is a Unicode index.

10. The method of claim 8 wherein the inserted index entries map to a key in the database the entries operating as place holders for previously undefined entries in the database.

11. The method of claim 8 wherein the place holders map to newly defined code points.

12. A computing system that processes characters encoded according to an expandable alphabet standard, the computing system comprising:
    a processor; and
    a computer-readable storage medium having stored thereon a computer program product for implementing a method for storing a data structure in a database, the data structure being usable to map code points to corresponding characters according to an encoding standard, the computer program product including computer-executable instructions which, when executed by a processor, cause the computing system to store the database, wherein the database, includes:
    an index of entries mapping a plurality of code points, according to a single encoding standard, to a plurality of characters;
    a table associated with the index of entries, the table including:
        one or more table identifiers;
        one or more entries associated with the index of entries, the one or more entries including secondary index identifiers associated with undefined entries; and
        a key to the index of entries;
    the table including index entries that map to newly defined code points of the same encoding standard not defined in the index of entries, the table being configured to enable processing of the newly defined code points outside of processing of code points in the index of entries.

13. In a computing system that processes characters encoded according to an expandable alphabet standard, a computer readable storage medium having stored thereon a computer program product for implementing a method for processing one or more strings of data even when characters in the one or more strings of data are undefined by an obsolete index stored in a first database, the obsolete index including code points for the expandable alphabet standard, the computer program product including computer-executable instructions which, when executed by a processor, cause the computing system to implement the method comprising:

receiving one or more strings of data encoded according to an encoded expandable alphabet standard;

accessing an obsolete index for a single encoded alphabet standard, wherein the index associates a numerical value to each of a plurality of characters, and such that each numerical value is a code point, and wherein the index maps code points to characters according to a single expandable alphabet standard;

identifying one or more undefined code points in the received one or more strings, wherein the undefined code points are not associated with any character by the obsolete index;

after receipt of one or more strings of data encoded according to the expandable alphabet, tracking each string including undefined code points;

for each undefined code point not associated with a character by the obsolete index, creating an entry in a table stored in a second database;

processing the tracked strings outside the processing of strings including only defined code points which are associated with characters by the obsolete index; and updating the obsolete index to produce an updated index in the first database, the updated index including newly defined code points which were undefined in the obsolete index.

14. The computer readable medium of claim 13, wherein the acts further comprise:

creating a database for maintaining the index; and using the entries in the table to identify newly defined code points to enable processing the tracked strings.

15. The computer readable medium of claim 13, wherein the acts further comprise:

identifying each code point that maps to a same index entry in the index of code points; and maintaining an entry in the table for each code point that maps to the same index entry.

16. The computer readable medium of claim 15, wherein processing the tracked strings includes:

normalizing the entries in the table using an obsolete index; and normalizing the entries in the table using a current index; and identifying the entries for which the normalizing produces different results, the different results indicative of newly defined code points.

17. The computer readable medium of claim 13, wherein the expandable alphabet is a Unicode character set.

18. In a computing system that processes characters according to an expandable alphabet, the expandable alphabet mapping characters to a database of defined code points, a computer readable storage medium having stored thereon a computer program product for implementing a method for updating data in a database holding one or more index entries, each index entry being associated with a record and one or more of the index entries associated with a record containing one or more undefined code points, the computer program product including computer executable instructions which, when executed by a processor, cause the computing system to implement the method comprising:

deleting index entries associated with a record containing one or more undefined code points, the deleting using a prior normalized version of the index entries stored in the database;

normalizing the data in the database using the records, the normalizing associated with an updated normalized version of the index entries; and inserting one or more index entries, the inserted index entries defining previously undefined characters, and thereby updating the database.

19. The computer readable medium of claim 18 wherein the database is a Unicode index.

20. The computer readable medium of claim 18 wherein the inserted index entries map to a key in the database the entries operating as place holders for previously undefined entries in the database.

21. The computer readable medium of claim 18 wherein the place holders map to newly defined code points.

* * * * *